United States Patent
Belghoul et al.

(10) Patent No.: US 11,792,599 B2
(45) Date of Patent: Oct. 17, 2023

(54) DEVICE SUPPORT FOR SCALABLE NEUTRAL HOST AND PRIVATE LTE/5G NETWORK DISCOVERY, AND DEVICE MOBILITY

(71) Applicant: Apple Inc., Cupertino, CA (US)

(72) Inventors: Farouk Belghoul, Campbell, CA (US);
Cesar Perez, Sunnyvale, CA (US);
Rafael L. Rivera-Barreto, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 413 days.

(21) Appl. No.: 16/452,600

(22) Filed: Jun. 26, 2019

(65) Prior Publication Data
US 2020/0008007 A1 Jan. 2, 2020

Related U.S. Application Data

(60) Provisional application No. 62/692,389, filed on Jun. 29, 2018.

(51) Int. Cl.
*H04W 4/00* (2018.01)
*H04W 4/021* (2018.01)
(Continued)

(52) U.S. Cl.
CPC ............ *H04W 4/021* (2013.01); *H04W 4/50* (2018.02); *H04W 8/005* (2013.01); *H04W 8/08* (2013.01); *H04W 24/08* (2013.01); *H04W 84/042* (2013.01)

(58) Field of Classification Search
CPC . H04W 88/06; H04W 76/27; H04W 72/1215; H04W 84/12; H04W 28/08; H04W 92/10; H04W 84/042; H04W 36/32
See application file for complete search history.

(56) References Cited

U.S. PATENT DOCUMENTS 6,529,491 B1 * 3/2003 Chang ................ H04W 48/18
370/335
9,088,995 B2 7/2015 Novak
(Continued)

FOREIGN PATENT DOCUMENTS

SE WO2008131591 * 11/2008 ............ H04Q 7/38

OTHER PUBLICATIONS

Key Bridge LLC; "Proposal to Administer a Environmental Sensing Capability"; May 13, 2016; 77 pages.

*Primary Examiner* — Abdelillah Elmejjarmi
(74) *Attorney, Agent, or Firm* — Kowert, Hood, Munyon, Rankin & Goetzel, P.C.

(57) ABSTRACT

A device, e.g. a wireless communication device may obtain information associated with private cellular networks from a provisioning server. The information may provide an indication of coverage area(s) of available private cellular network(s). The device may communicate over a commercial cellular network, and determine, based at least on the information, whether the device is located within the coverage area of any available private cellular networks. The device may connect to a first private cellular network (FPCN) of the available private cellular networks and switch from communicating over the commercial cellular network to communicating over the FPCN at least in response to the determination indicating that the device is located within the indicated coverage area. The device may disconnect from the FPCN in response to a determination that the signal level of the FPCN is below a specified value and the device is not using a wallet garden application.

20 Claims, 13 Drawing Sheets

(51) Int. Cl.
  *H04W 8/00*    (2009.01)
  *H04W 8/08*    (2009.01)
  *H04W 24/08*   (2009.01)
  *H04W 4/50*    (2018.01)
  *H04W 84/04*   (2009.01)

(56) References Cited

U.S. PATENT DOCUMENTS

| | | | |
|---|---|---|---|
| 9,769,666 B2 | 9/2017 | Salyers | |
| 10,021,706 B2 | 7/2018 | Mishra | |
| 2008/0112373 A1* | 5/2008 | Shpak | H04W 76/11 370/338 |
| 2008/0318576 A1* | 12/2008 | So | H04W 36/0066 455/434 |
| 2010/0027510 A1* | 2/2010 | Balasubramanian | H04W 48/18 370/332 |
| 2012/0263145 A1* | 10/2012 | Marinier | H04W 36/14 370/331 |
| 2015/0024787 A1* | 1/2015 | Ben-Itzhak | H04L 12/1845 455/456.4 |
| 2016/0100331 A1* | 4/2016 | Ahmavaara | H04W 72/0406 370/236 |
| 2017/0048787 A1* | 2/2017 | Lindoff | H04W 56/0035 |
| 2018/0014340 A1* | 1/2018 | Hill | H04W 36/32 |

* cited by examiner

DEVICE SUPPORT FOR SCALABLE NEUTRAL HOST AND PRIVATE LTE/5G NETWORK DISCOVERY, AND DEVICE MOBILITY

PRIORITY CLAIM

This application claims benefit of priority of U.S. Provisional Patent Application Ser. No. 62/692,389 titled "Device Support for Scalable Neutral Host and Private LTE/5G Network Discovery, and Device Mobility", filed on Jun. 29, 2018, which is hereby incorporated by reference as though fully and completely set forth herein.

FIELD OF THE INVENTION

The present application relates to wireless communications, and more particularly to providing support in mobile devices for scalable neutral host and private LTE/5G network discovery, and mobility.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc. A next telecommunications standards moving beyond the current International Mobile Telecommunications-Advanced (IMT-Advanced) Standards is called 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than current LTE standards.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. The UEs, which may be mobile telephones or smart phones, portable gaming devices, laptops, wearable devices, PDAs, tablets, portable Internet devices, music players, data storage devices, or other handheld devices, etc. may have multiple radio interfaces that enable support of multiple radio access technologies (RATs) as defined by the various wireless communication standards (LTE, LTE-A, Wi-Fi, BLUETOOTH™, etc.). The radio interfaces may be used by various applications and the presence of the multiple radio interfaces may necessitate the UE to implement mobility solutions to seamlessly run applications simultaneously over multiple radio interfaces (e.g., over LTE/LTE-A and BLUETOOTH™) without impacting the end-to-end performance of the application. Furthermore, a UE oftentimes implements an algorithm/policy for switching between the various wireless interfaces for certain applications, e.g. for streaming data, or for conducting audio/voice calls. For example, VoLTE allows UEs to conduct audio calls over LTE in addition to also having the ability to conduct voice calls over a circuit switched (CS) network.

The rapid spread and use of wireless communications has led to an ever increasing deployment of distributed antenna systems (DAS). Driven in part by rising bandwidth requirements and quality of service expectations, the deployment and maintenance of today's advanced DAS has experienced a steady cost increase. For many years, auctioned licensed spectrum allocations statewide and nationwide were exclusively acquired by Tier-1 cellular carriers as it proved too expensive for Tier-2/Tier-3 carriers and other potential local operators. Tier-1 carriers were thereby able to use the allocated spectrum as a strategic asset for 3GPP technologies, which has proven to be a barrier preventing innovation in wireless services and also slowing down service improvements. For example, deployment has been focused on Tier-1 venues, leaving Tier-2/Tier-3 venues and indoor venues with poor coverage. According to some estimates, approximately 30 billion square feet of commercial floor space in the United States experiences poor cellular coverage. Tier-2/Tier-3 network operators, enterprises, small communities and venue owners have not been able to acquire spectrum that would allow them to improve the wireless coverage in Tier-2/Tier-3 venues and indoor private buildings, which slows the densification and installation of small cells.

For at least the above reasons, the wireless industry as a whole has been pursuing a variety of service delivery models designed to offset the high costs while ensuring reliable and profitable in-building coverage and capacity. One particular DAS that has received much attention is the neutral host DAS, or neutral host for short. A neutral host shifts the ownership of the system from a carrier to either a building owner, DAS integrator or a third-party system provider. Present day DAS system deployments, e.g. in enterprise buildings, have proven to be extremely expensive due to the required installation of Tier-1 carrier equipment for operating in the carrier's licensed spectrum. Under the neutral host model, the independent third-party host assumes all financial, regulatory, legal and technical responsibility for deploying, installing and maintaining the system. The host may lease space or access to the system to one or more operators. The neutral host model provides a number of attractive benefits, chief among them the increased number of providers who are able and willing to help satisfy the growing demand in the market. To facilitate the installation, reduce the cost, and simplify the process and spread of effective neutral hosts, a new Citizens Broadband Radio Service (CBRS) for shared wireless broadband use of the 3550-3700 MHz band (3.5 GHz Band) was established. CBRS provides potential benefits of indoor and outdoor cellular services, e.g. LTE/NR services within a shared 3.5 GHz spectrum by opening up those bands for commercial use such as carrier-based cellular service extensions and private LTE/NR networks within enterprises, sports stadiums and conference centers, among others. Such services promise to complement, and in some cases possibly replace Wi-Fi, in addition to paving the way for 5G/NR wireless services. In other words, CBRS band(s) can be used by cellular networks to provide private LTE and neutral host networks (e.g. Wi-Fi Type deployments in buildings and enterprises) using LTE or 5G/NR small cells and networks.

The welcome addition of these new wireless services also raises new issues. Devices are expected to recognize and efficiently connect with and operate on these new wireless networks. In addition, improved device mobility is required to allow devices to seamlessly move from operating on one wireless service to operating on another wireless service.

Other corresponding issues related to the prior art will become apparent to one skilled in the art after comparing such prior art with the disclosed embodiments as described herein.

SUMMARY OF THE INVENTION

Embodiments are presented herein of, inter alia, of methods and procedures for support in various devices, e.g. wireless communication devices, for the discovery of neutral hosts and private LTE/NR networks, and for mobility between various wireless communication systems that include neutral hosts and private LTE/NR networks. Embodiments are further presented herein for wireless communication systems containing wireless communication devices (UEs) and/or base stations and access points (APs) communicating with each other within the wireless communication systems.

Pursuant to the above, a device may obtain information associated with private cellular networks from a provisioning server, with the information providing an indication of a coverage area of available private cellular networks, e.g. Citizens Broadband Radio Service (CBRS) servers. The device may also communicate according to a first wireless radio access technology (RAT) over a commercial cellular network, and determine, based at least on the information, whether the device is located within the indicated coverage area of the available private cellular networks. The device may connect to a private cellular network (of the private cellular networks) and switch from communicating over the commercial cellular network to communicating over the first private cellular network at least in response to determining that the device is located within the indicated coverage area.

The device may periodically obtain updated information associated with the private cellular networks from the provisioning server, with the updated information indicating an updated coverage area of the available private cellular networks. The device may continue to monitor, in the background, its location at least in response to the determination indicating that the device is not located within the indicated coverage area. In addition, the device may connect to the private cellular network additionally in response to an indication that the device is in idle mode on the commercial cellular network. The device may also perform inter-frequency measurements in frequency bands associated with the available private cellular networks, prior to connecting to the first private cellular network, at least in response to the determination indicating that the device is located within the coverage area and is in idle mode on the commercial cellular network. The inter-frequency measurements may be started by the device after each paging, and may be stopped by the device at least in response to an indication that device is no longer in the indicated coverage area. The device may disconnect from the private cellular network at least in response to a determination that a signal level of the first private cellular network is below a specified threshold value and the device is not using an application specific to the private cellular network (e.g. the device is not using a garden wallet application). The communications of the device over the private cellular network may also be performed according to the first RAT, which may include LTE and/or NR communications, among others.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
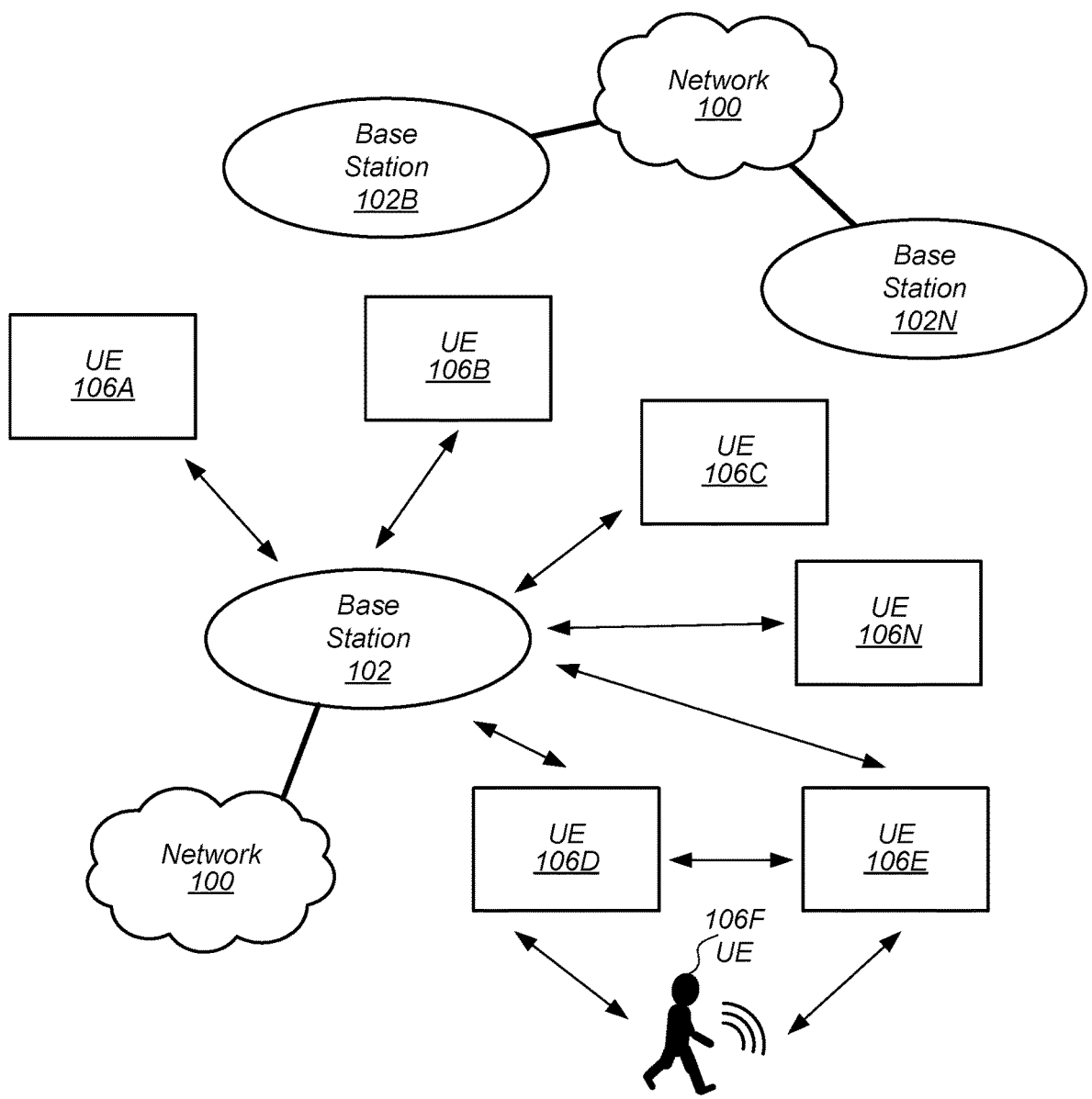
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AMR: Adaptive Multi-Rate
AP: Access Point
APN: Access Point Name
APR: Applications Processor
BS: Base Station
BSR: Buffer Size Report
BSSID: Basic Service Set Identifier
CBRS: Citizens Broadband Radio Service
CBSD: Citizens Broadband Radio Service Device
CCA: Clear Channel Assessment
CMR: Change Mode Request
CS: Circuit Switched
DL: Downlink (from BS to UE)
DSDS: Dual SIM Dual Standby
DYN: Dynamic
EDCF: Enhanced Distributed Coordination Function
FDD: Frequency Division Duplexing
FO: First-Order state
FT: Frame Type
GAA: General Authorized Access
GPRS: General Packet Radio Service
GSM: Global System for Mobile Communication
GTP: GPRS Tunneling Protocol
IMS: Internet Protocol Multimedia Subsystem
IP: Internet Protocol
IR: Initialization and Refresh state
KPI: Key Performance Indicator
LAN: Local Area Network
LBT: Listen Before Talk
LQM: Link Quality Metric
LTE: Long Term Evolution
MNO: Mobile Network Operator
NB: Narrowband
OOS: Out of Sync
PAL: Priority Access Licensee
PDCP: Packet Data Convergence Protocol
PDN: Packet Data Network
PDU: Protocol Data Unit
PGW: PDN Gateway
PLMN: Public Land Mobile Network
PSD: Power Spectral Density
PSS: Primary Synchronization Signal
PT: Payload Type
QBSS: Quality of Service Enhanced Basic Service Set
QI: Quality Indicator
RAT: Radio Access Technology
RF: Radio Frequency
ROHC: Robust Header Compression
RTP: Real-time Transport Protocol
RTT: Round Trip Time
RX: Reception/Receive
SAS: Spectrum Allocation Server
SID: System Identification Number
SIM: Subscriber Identity Module
SGW: Serving Gateway
SMB: Small/Medium Business
SSS: Secondary Synchronization Signal
TBS: Transport Block Size
TCP: Transmission Control Protocol
TDD: Time Division Duplexing
TX: Transmission/Transmit
UE: User Equipment
UL: Uplink (from UE to BS)
UMTS: Universal Mobile Telecommunication System
USIM: UMTS Subscriber Identity Module
WB: Wideband
Wi-Fi: Wireless Local Area Network (WLAN) RAT based on the Institute of Electrical and Electronics Engineers' (IEEE) 802.11 standards
WLAN: Wireless LAN

Terms

The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable.

Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
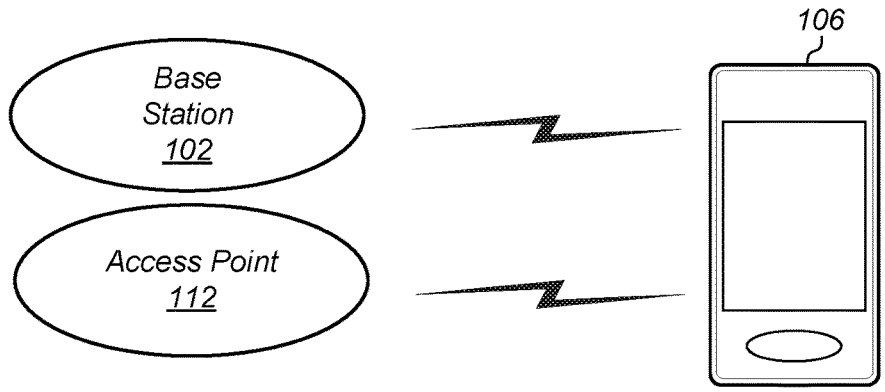
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A through 106N. Each of the user devices may be referred to herein as a "user equipment" (UE) or UE device. Thus, the user devices 106 are referred to as UEs or UE devices. Various ones of the UE devices may operate to discover neutral hosts and private LTE/NR networks, with the capacity to effectively move between various wireless communication systems that include neutral hosts and private LTE/NR networks, and operate on those networks according to various embodiments disclosed herein.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, neutral host or various CBRS deployments, among various possibilities). Thus, the base station 102 may facilitate communication between the user devices and/or between the user devices and the network 100. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if the base station 102A is implemented in the context of LTE, it may alternately be referred to as an 'eNodeB' or eNB'. Note that if the base station 102A is implemented in the context of 5G NR, it may alternately be referred to as 'gNodeB' or 'gNB'. In some embodiments, the base station 102 (e.g. an eNB in an LTE network or a gNB in an NR network) may communicate with at least one UE having the capability to discover neutral hosts and private LTE/NR networks, and also having the capacity to effectively move between various wireless communication systems (which may include neutral hosts and private LTE/NR networks), and operate on those networks as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to Citizens Broadband Radio Service (CBRS). Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services. UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). Base station 102A and other similar base stations (such as base stations 102B . . . 102N) operating according to the same or a different cellular communication standard may thus be provided as one or more networks of cells, which may provide continuous or nearly continuous overlapping service to UE 106 and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, the UE 106 may also communicate with Network 100, through one or more base stations or through other devices, stations, or any appliances not explicitly shown but considered to be part of Network 100. UE 106 communicating with a network may therefore be interpreted as the UE 106 communicating with one or more network nodes considered to be a part of the network and which may interact with the UE 106 to conduct communications with the UE 106 and in some cases affect at least some of the communication parameters and/or use of communication resources of the UE 106.

Furthermore, as also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting with the vehicles represented by UEs 106D and 106E in a similar manner. Various aspects of vehicles communicating in a network exemplified in FIG. 1 are disclosed in the context of vehicle-to-everything (V2X) communications such as the communications specified by 3GPP TS 22.185 V 14.3.0, among others.

FIG. 2 illustrates an exemplary user equipment 106 (e.g., one of the devices 106-1 through 106-N) in communication with the base station 102 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, e.g. those previously mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include radio circuitries for communicating using either of LTE or CDMA2000 1×RTT or NR, and/or communicating using each of Wi-Fi and BLUETOOTH™. Other configurations are also possible.

Figure 3:
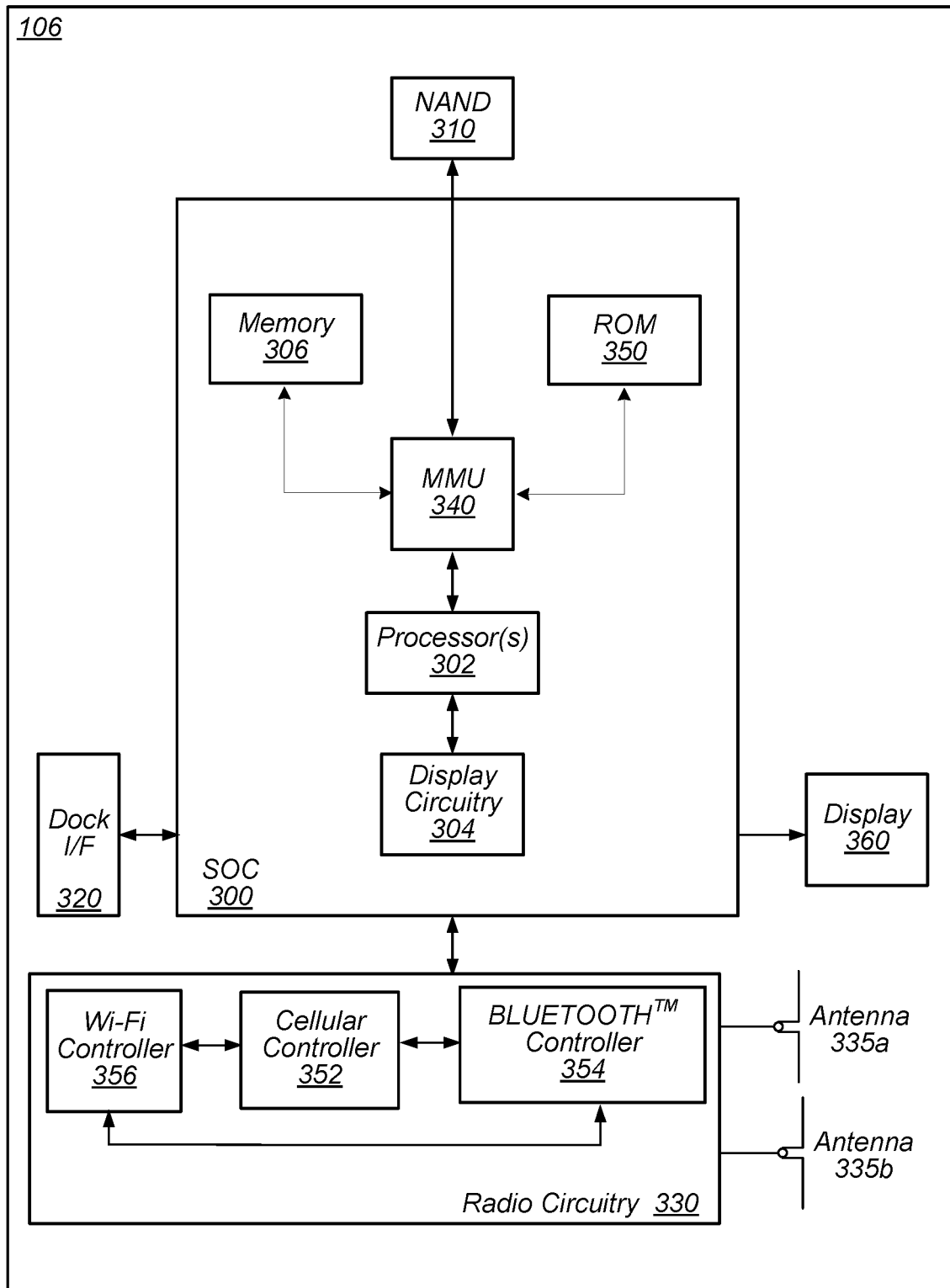
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for at least UE 106 to discover neutral hosts and private LTE/NR networks, with the capacity to effectively move between various wireless communication systems that include neutral hosts and private LTE/NR networks, and operate on those networks as further detailed herein. Thus, in some embodiments, UE 106 may use, among others, information indicative of coverage areas of available private cellular networks, to detect and potentially connect to private networks, and switch from operating on a primary (major provider) cellular network to operating on the private cellular network. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 that incorporate discovering neutral hosts and private LTE/NR networks, and effectively moving between various wireless communication systems that include neutral hosts and private LTE/NR networks, and operating on those networks according to various embodiments disclosed herein. Specifically, processor(s) 302 may be coupled to and/or may interoperate with other components as shown in FIG. 3 to facilitate UE 106 communicating in a manner that seeks to optimize RAT selection. Processor(s) 302 may also implement various other applications and/or end-user applications running on UE 106.

In some embodiments, radio 300 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106.

Figure 4:
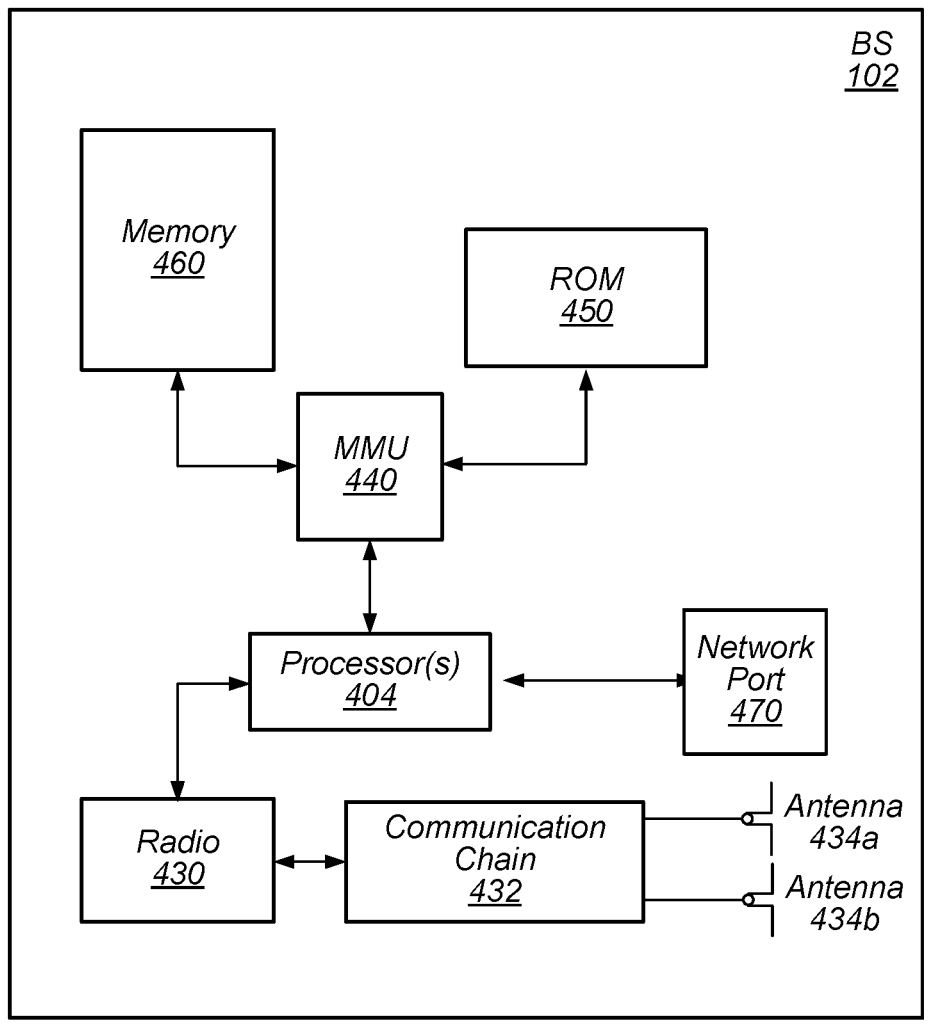
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434a, and possibly multiple antennas (e.g. illustrated by antennas 434a and 434b), for performing wireless communication with mobile devices and/or other devices. Antennas 434a and 434b are shown by way of example, and base station 102 may include fewer or more antennas. Overall, the one or more antennas are collectively referred to as antenna(s) 434. Antenna(s) 434 may be configured to operate as a wireless transceiver and may be further configured to communicate with UE devices 106 via radio circuitry 430. The antenna(s) 434 communicates with the radio 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR (NR) WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device capable of discovering neutral hosts and private LTE/NR networks, and having the capacity to effectively move between various wireless communication systems that include neutral hosts and private LTE/NR networks, and operate on those networks. Alternatively, the processor(s) 404 may be configured as a programmable hardware element(s), such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for communicating with mobile devices capable of discovering neutral hosts and private LTE/NR networks, with the capacity to effectively move between various wireless communication systems that include neutral hosts and private LTE/NR networks, and operate on those networks, according to various embodiments described herein.

Figure 5:
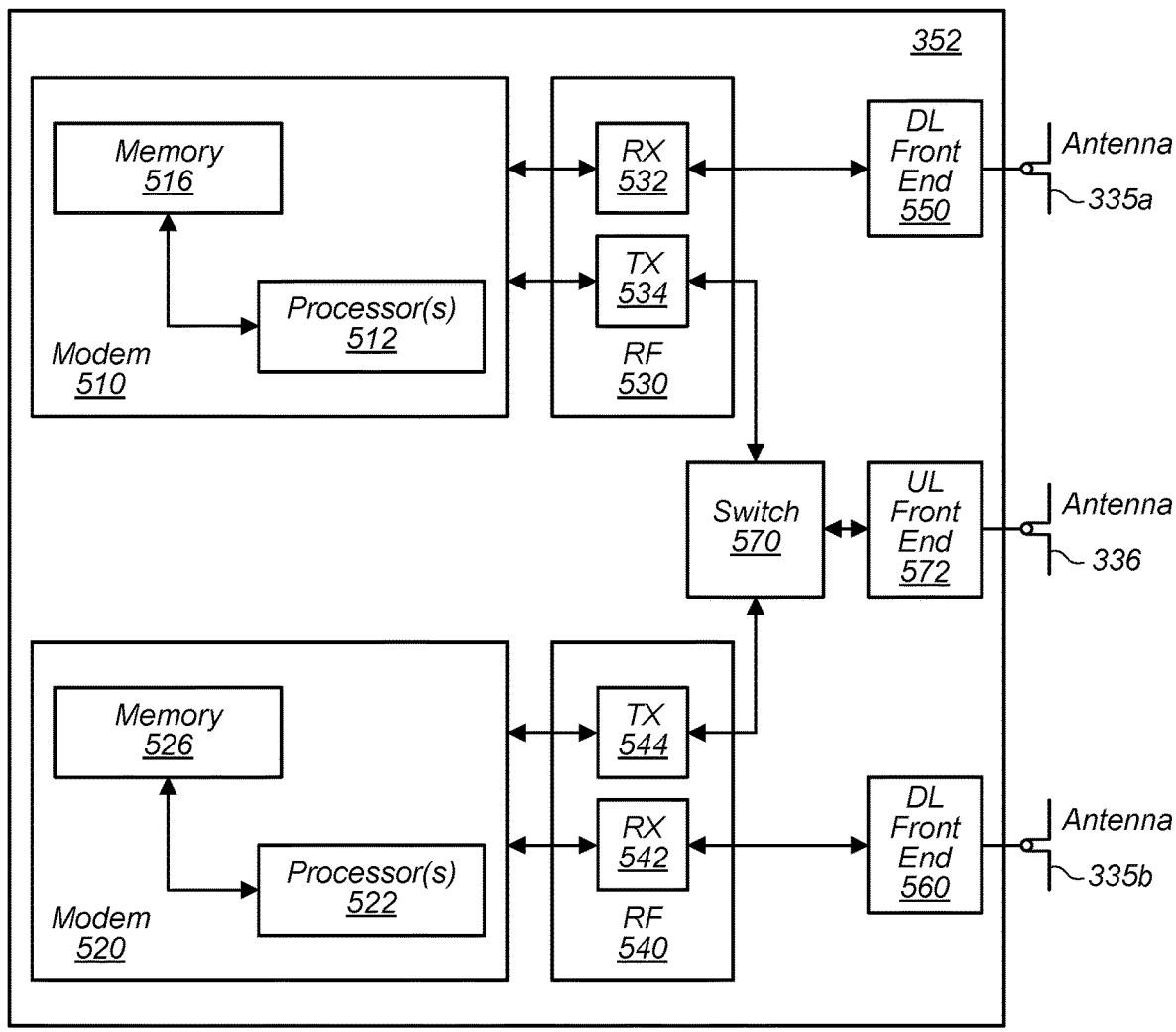
FIG. 5 shows an exemplary simplified block diagram illustrative of cellular communication circuitry, according to some embodiments.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more components. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

Figure 6:
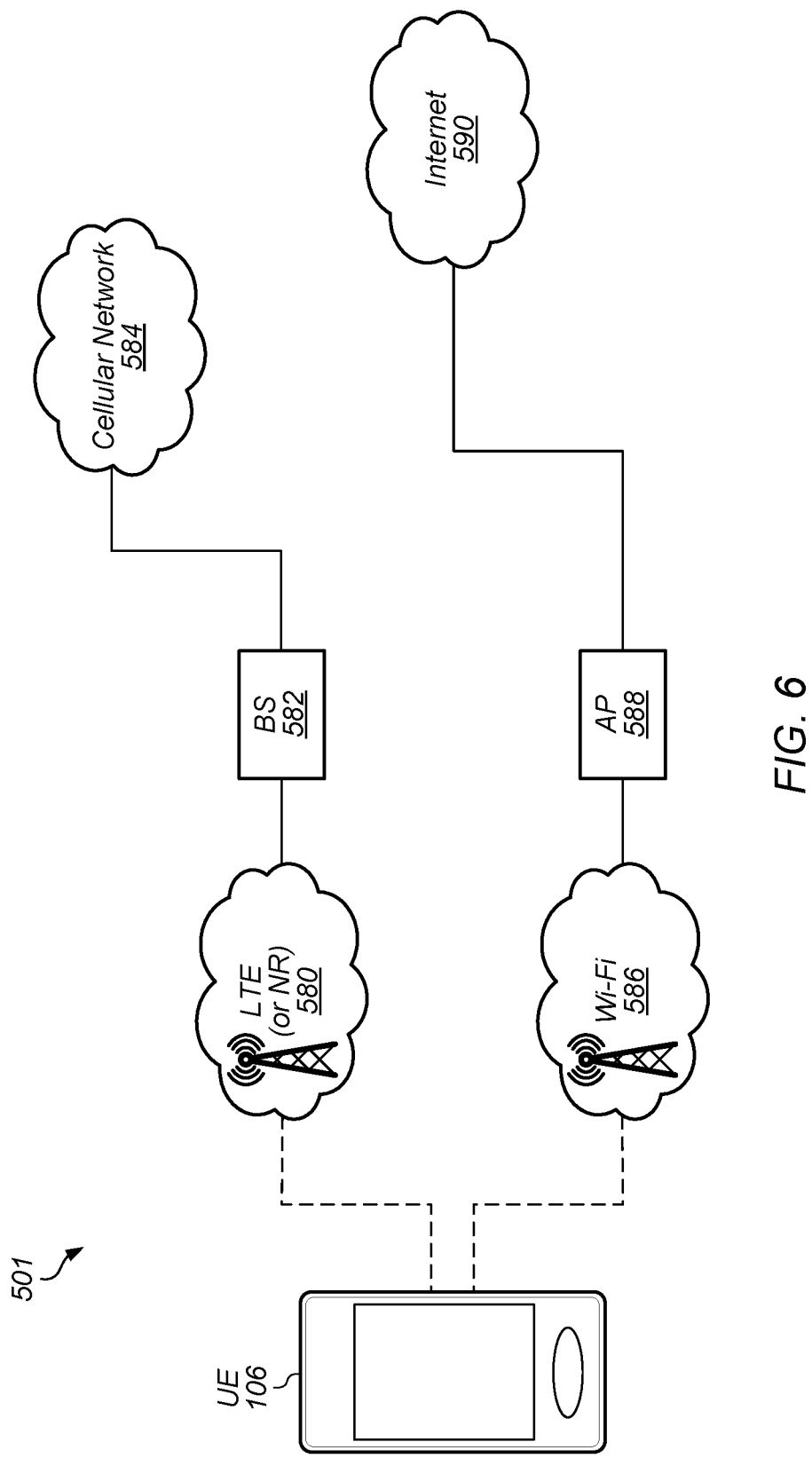
FIG. 6 illustrates an exemplary wireless communication system providing cellular and Wi-Fi coverage, according to some embodiments.

FIG. 6—Exemplary Communication System

FIG. 6 illustrates an exemplary wireless communication system 501 in which a device may communicate according to multiple radio access technologies (RATs) using different respective radio circuits for each RAT. System 500 is a system in which an LTE (or NR) access network and a Wi-Fi radio access network are implemented. The system 500 may include UE 106 and LTE (or NR) network 580 and Wi-Fi network 586.

LTE (or NR) access network 580 is representative of some embodiments of a first RAT access and Wi-Fi access network 586 is representative of some embodiments of a second RAT access. LTE (or NR) access network 580 may be interfaced with a broader cellular network (e.g. LTE or NR) and Wi-Fi access network 586 may be interfaced with the Internet 590. More particularly, LTE (or NR) access network 580 may be interfaced with a serving base station (BS) 582, which may in turn provide access to broader cellular network 584. The Wi-Fi access network 586 may be interfaced with an access point (AP) 588, which may in turn provide access to the Internet 590. UE 106 may accordingly access Internet 590 via AP 588 and may access cellular network 584 via LTE access network 580. In some embodiments, not shown, UE 106 may also access Internet 590 via LTE (or NR) access network 580. More specifically, LTE (or NR) access network 580 may be interfaced with a serving gateway, which may in turn be interfaced with a packet data network (PDN) gateway. The PDN gateway may, in turn, be interfaced with Internet 590. UE 106 may accordingly access Internet 590 via either or both of LTE (or NR) access network 580 and Wi-Fi access network 586. Accordingly, UE 106 may conduct various communications, e.g. data transfers or audio voice calls, via either or both of LTE (or NR) access network 580 and Wi-Fi access network 586. Furthermore, while FIG. 6 shows an LTE (or NR) access network, other cellular networks (not shown, e.g. a CBRS network) may equally be accessed by UE 106 in a manner similar to accessing LTE (or NR) access network 580.

Figure 7:
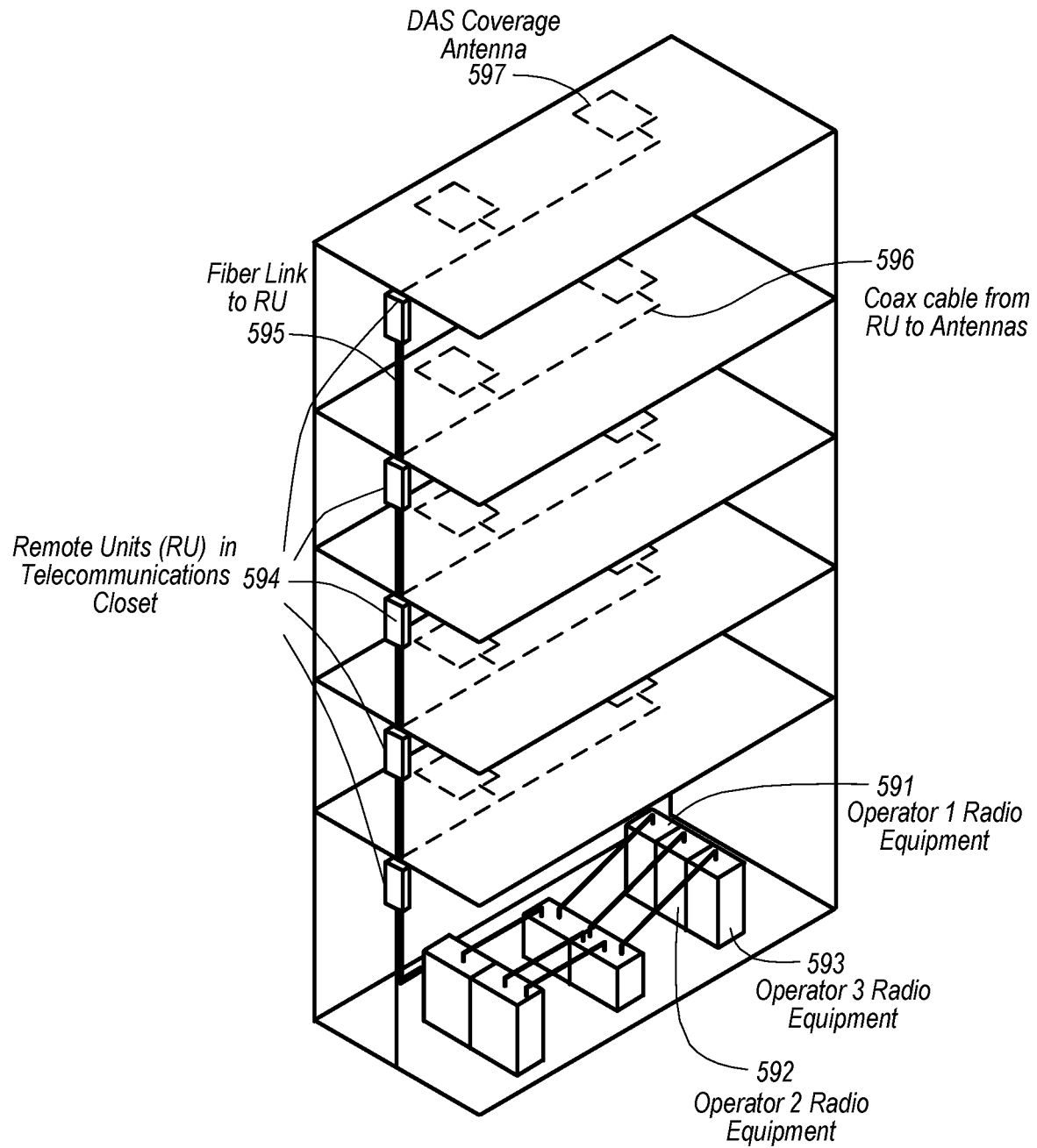
FIG. 7 is an illustration of an exemplary distributed antenna system setup in a building.

FIG. 7—Exemplary Distributed Antenna System Setup in a Building

FIG. 7 shows an illustration of an exemplary distributed antenna system in a single locale, e.g. in an office building. As previously mentioned, in order to facilitate the installation and spread of effective neutral hosts, the Citizens Broadband Radio Service (CBRS) for shared wireless broadband use of the 3550-3700 MHz band (3.5 GHz Band) was established. CBRS provides potential benefits of indoor and outdoor LTE or NR services within a shared 3.5 GHz spectrum by opening up those bands for commercial use such as private LTE or NR networks within enterprises and buildings, e.g. as shown in FIG. 7. In the exemplary building shown in FIG. 7, three radio operators may set up networks via respective operator radio equipment units 591, 592, and 593. Remote unit(s) 594 may be set up in telecommunications closets with fiber link 595 connecting the remote unit(s) 594. Coverage antenna(s) 597 may be set up on one or more floors, with coaxial cables 596 connecting the remote units to the antenna(s). Of course, the system illustrated in FIG. 7 is exemplary, with fewer or more operators establishing a network within the building in a manner similar to that shown.

Figure 8:
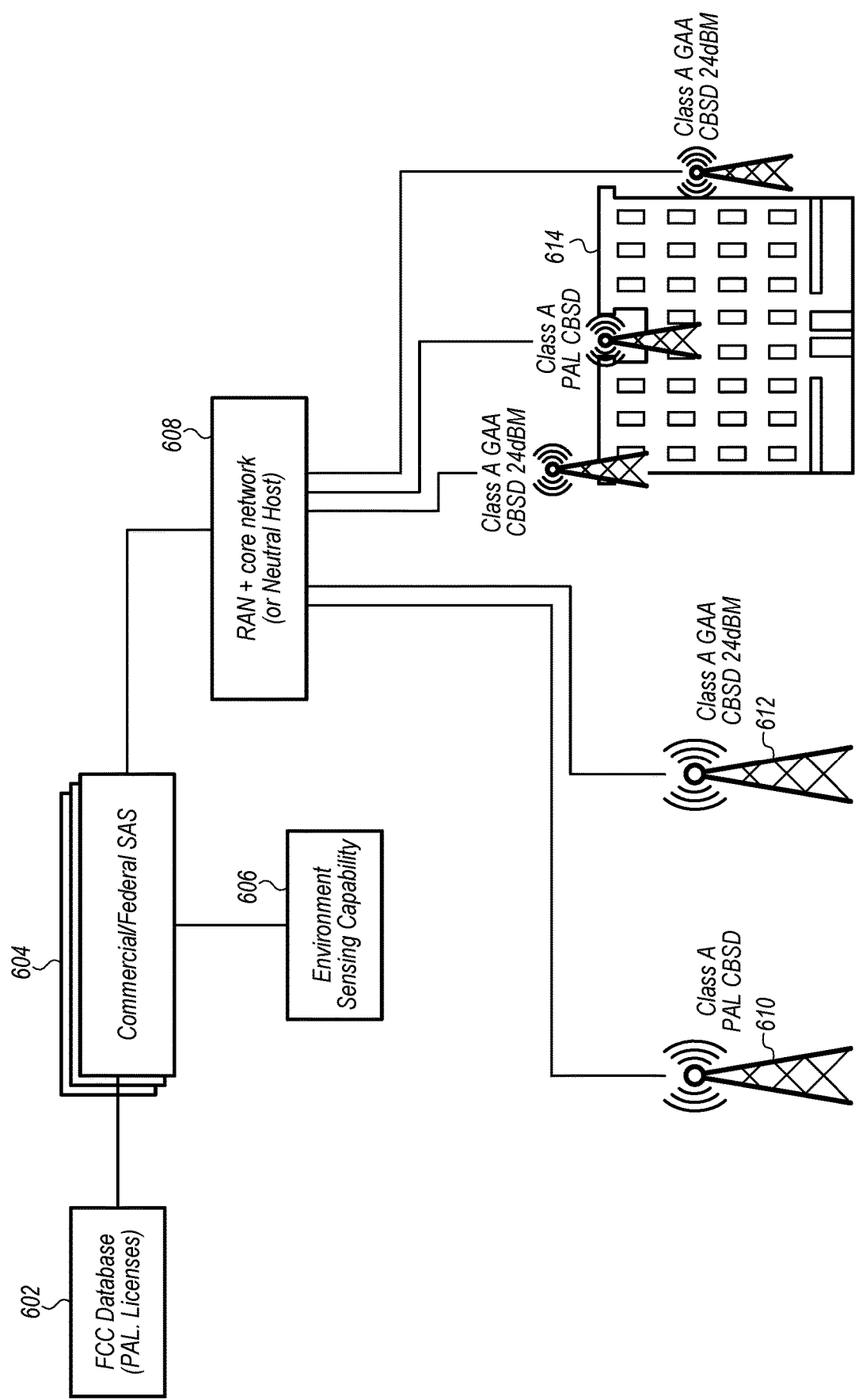
FIG. 8 shows a diagram providing an exemplary overview of CBRS networking and technology.

FIG. 8—Exemplary Overview of CBRS Networking and Technology

FIG. 8 shows a diagram providing an exemplary overview of CBRS networking and technology. A database 602 may include a list of Federal Communications Commission (FCC) Priority Access Licensee (PAL) licenses which may be used by a commercial/federal spectrum allocation server or spectrum access system (SAS, 604) to enable devices to operate on a radio access network (RAN) and core network (or neutral host) 608. Access towers 610 and 612 may respectively represent Citizens Broadband Radio Service Device (CSBD) base stations for PAL access and General Authorized Access (GAA). An enterprise building 614 may include installations of such access points (e.g. base stations) for operation of a CBRS network in building 614. The allocation server 604 may also feature environment sensing capability 606 to facilitate coexistence of the CBRS users with licensed users through signal sensing.

Exemplary Overview of CBRS Networking and Technology and Deployment Venues

Figure 9:
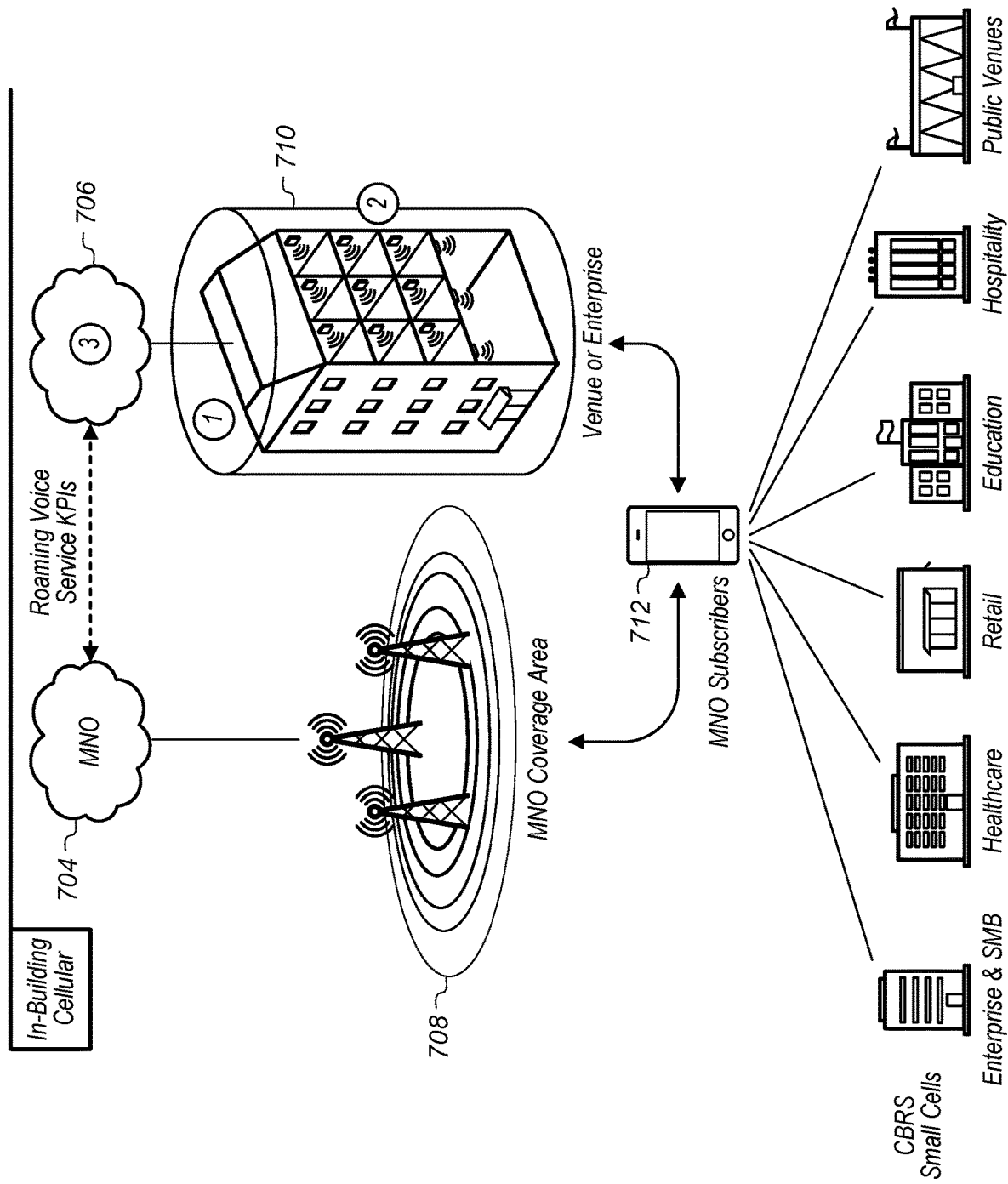
FIG. 9 shows a diagram illustrating an exemplary CBRS and neutral host deployment.
Figure 10:
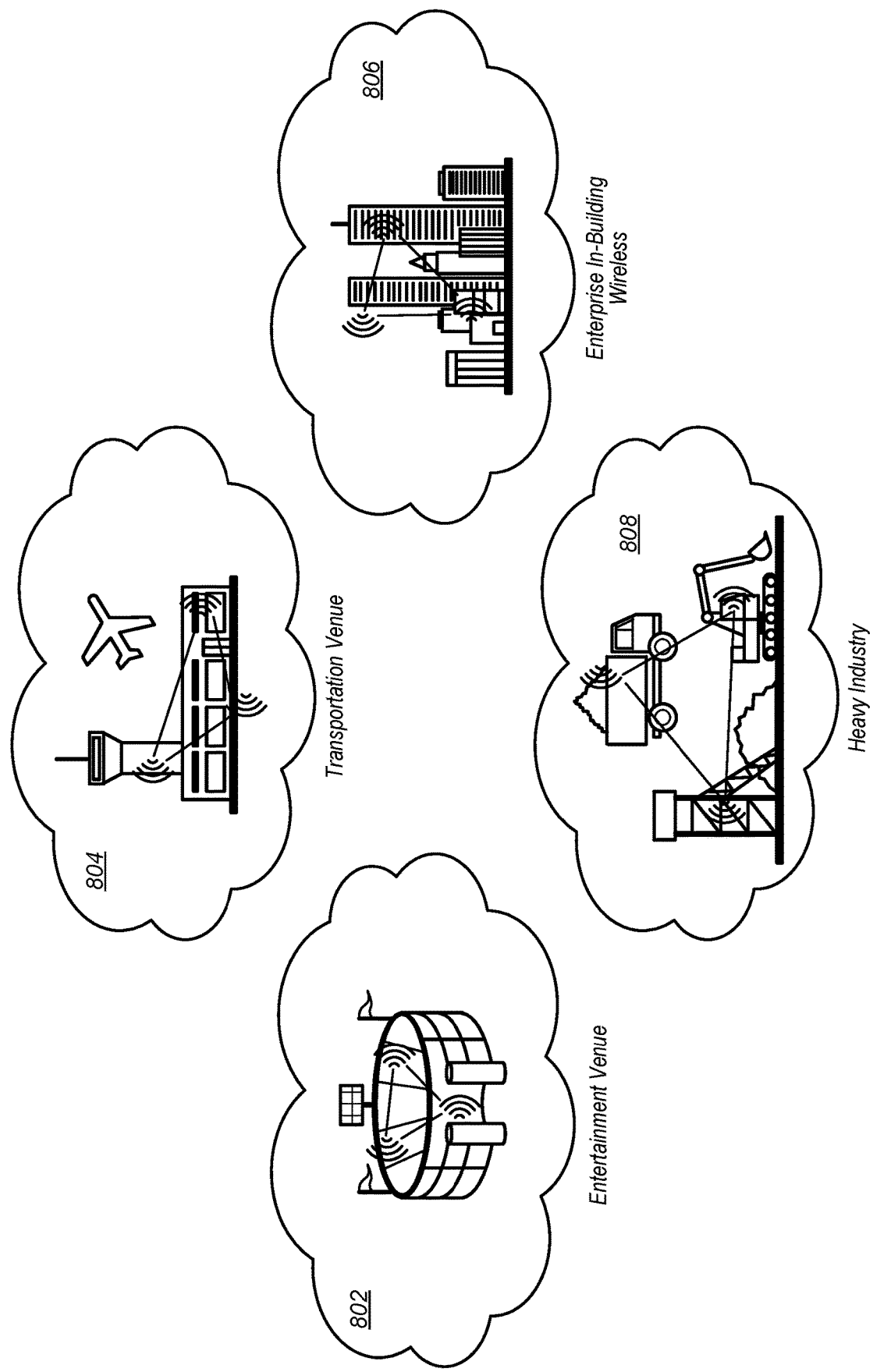
FIG. 10 shows a diagram illustrating exemplary venues operating CBRS private networks.

FIG. 9 shows a diagram illustrating an exemplary CBRS and neutral host deployment for in-building cellular coverage. A mobile network operator (MNO) 704 may have a coverage area 708, while a CBRS small cell coverage area may be implemented in venue/enterprise building 710. Roaming voice service key performance indicators (KPIs) may be transmitted between MNO 704 and CBRS coverage area/network 706. MNO subscriber devices, exemplified in FIG. 9 by device 712, may be operated on the MNO's network as well as the CBRS network 706. As indicated in FIG. 9, example of locations where CBRS networks may be set up include enterprise and small/medium business locations, healthcare facilities, retail facilities, education buildings, hospitality/travel facilities and public venues, among others. FIG. 10 shows a diagram illustrating further examples of venues where CBRS private networks may be operated, such as transportation venues 804, enterprise buildings 806, entertainment venues 802, and industrial locations 808.

Cellular operators typically use subscriber identity modules (SIMs) to provide devices (e.g. mobile phones) with user credential/information allowing the device to attach to a wireless network. A neutral host and private network using cellular technology in CBRS is part of a new business model in with enterprise and venue owners deploy a cellular private network in their respective venues. Many such private cellular networks are similar in size to Wi-Fi networks. Devices already operating on major subscriber networks have to be provisioned to support and operate in multiple private networks in addition to operating on the mobile operator network. This raises new issues, e.g. how the device should start searching for private/small cellular networks when the cellular radio circuitry (e.g. cellular controller 356 shown in FIG. 3) is already in use for the main connection to SIM carriers.

Figure 11:
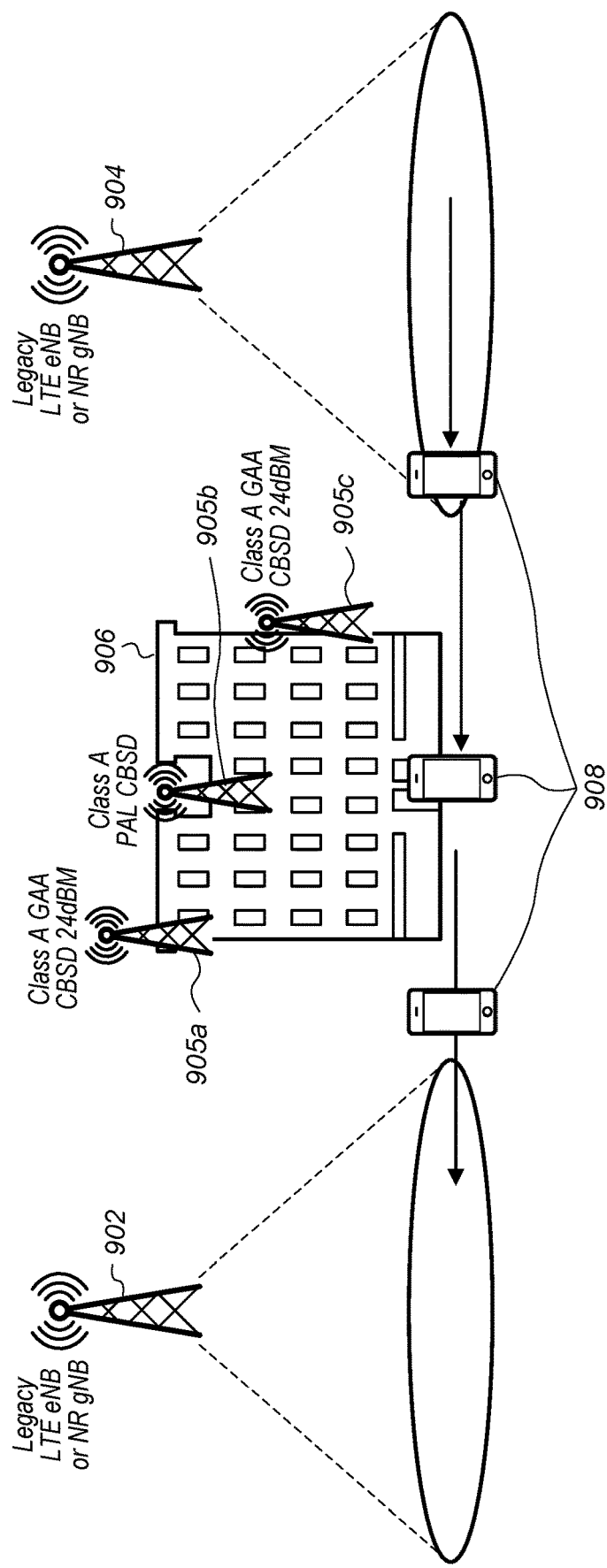
FIG. 11 shows a diagram illustrating device mobility between LTE and CBRS networks.

FIG. 11 shows a diagram illustrating device mobility between LTE or NR networks represented by access (base) stations 902 and 904 and CBRS networks represented by the access (base) stations situated in enterprise/building 906. Mobile wireless device 908 may be moving between the respective coverage areas of base stations 904, 902, and the CBRS base stations (905a, 905b, and 905c, collectively referred to as CBRS base stations 905) of building 906. FIG. 11 shows three different types of CBRS base stations for purposes of illustration. Therefore, base stations 905a and 905c are indicated as class A GAA CBSDs operating at 24 dBM power, while base station 905b is indicated as a class A PAL CBSD. However, CBRS base stations 905 may be of any other suitable type for establishing a CBRS network. Within existing large cellular networks, for example as represented by base stations 902 and 904 in FIG. 11, the mobility between eNBs or gNBs (e.g. between the respective cells covered by base stations 902 and 904) is based on the X2 interface platform established between base stations 902 and 904, and careful planning. The carrier may provision each eNB/gNB with a list of neighbor cells and threshold values for handover and reselection. On the other hand, there are currently no mobility provisions for devices moving between private LTE/NR networks and other networks (for comprehensive nationwide cellular coverage), which prevents X2-based handovers between private LTE/NR networks and outside macro (major provider) coverage. With respect to applications that may be executing on the device (e.g. on device 908), there are currently no provisions to take into account running applications and their usage in determining whether to switch between private LTE/NR coverage and outside (major provider) coverage. In addition, there are currently no provisions to take in account a per device (e.g. user) preference in selecting between private LTE/NR coverage and outdoor/macro cellular coverage.

New eSIM Provisioning Using Geofencing

Geofencing is the use of global positioning system (GPS) or radio frequency identification (RFID) technology to create a virtual geographic boundary, enabling a trigger response when a mobile device enters or leaves a particular area. The response may be triggered by an application running on the device and specifically designed for such purpose or as part of any control mechanism and/or algorithm implementing mobility functions of the device. An eSIM is a SIM card that may be embedded/integrated in the mobile device, for example in the form of an integrated SIM chip that is not intended to be removed from the device. The eSIM is also sometimes referred to as an embedded Universal Circuit Card (eUICC). The information on the eSIM is intended to be compliant and rewritable by all operators.

Figure 12:
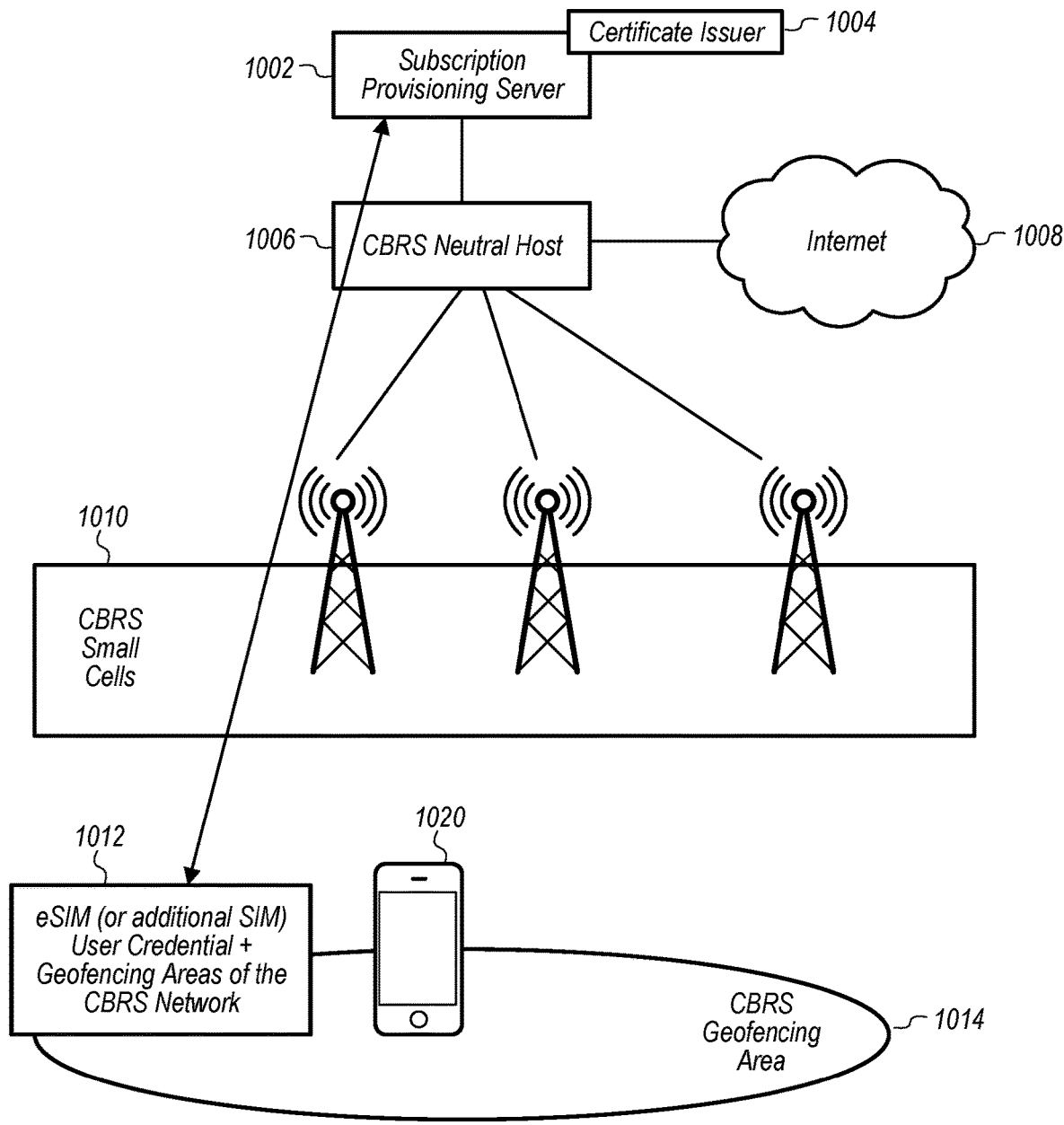
FIG. 12 shows a diagram illustrating a network structure in which new device eSIM provisioning using geofencing is implemented for private network discovery and device mobility, according to some embodiments.
Figure 13:
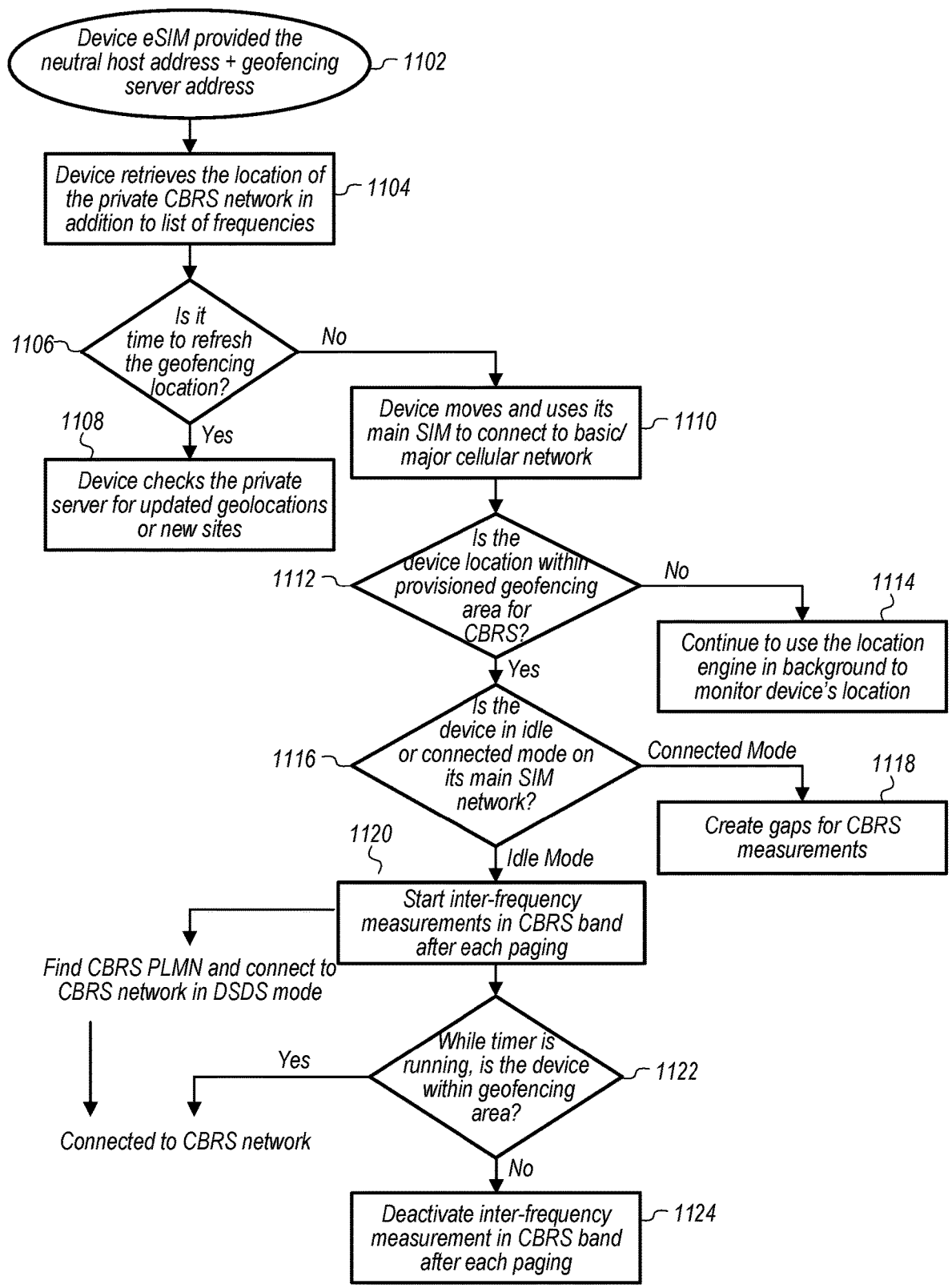
FIG. 13 shows a flow diagram illustrating an exemplary procedure for private network discovery, according to some embodiments.

FIG. 12 shows a diagram illustrating a network structure in which new device eSIM (or more generally, additional SIM) provisioning using geofencing is implemented for private network discovery and device mobility, according to some embodiments. As previously mentioned, geofencing refers to the use of GPS or RFID technology to create a virtual geographic boundary, enabling the triggering of a response, for example via software, when a mobile device enters or leaves a particular area and/or location defined by such a boundary. Such bounded areas and/or locations may be referred to as "geofencing areas" or "geofencing locations". Thus, a mobile device leaving a geofencing area may trigger a response in the device, for example via software. A geofencing area(s) 1014 representative of CBRS small cell coverage may be established and/or identified. Device 1020 may include an additional SIM, for example eSIM 1012 storing user credential information. The additional SIM or eSIM (exemplified by eSIM 1012 in FIG. 12) in device 1020 is in addition to a main SIM associated with a main account, e.g. a commercial/major cellular network account. In this case, device 1020 may use its main SIM as the primary SIM, in which case the credentials associated with the main SIM are designated for use as the default for communications conducted by the device. However, device 1020 may at any time designate either SIM (or any one of multiple SIMs in case device 1020 is outfitted with more than two SIMs and/or eSIMs) as the primary SIM. For example, device 1020 may switch to using eSIM 1012 as the primary SIM, in which case the credentials associated with eSIM 1012 become the default credentials for communications conducted by the device. The address of provisioning server 1002 and the address of CBRS neutral host 1006 may be provided to device 1020 in the eSIM 1012. Device 1020 may then retrieve information indicative of the geofencing area(s) representative of the CBRS network(s) 1010 from subscription provisioning server 1002, and may store that information, e.g. in eSIM 1012. The provisioning server 1002 may use certificates for remote SIM/eSIM provisioning entities, e.g. from certificate issuer 1004 which may act as a trusted third party for the purpose of authenticating the entities of the network structure shown in FIG. 12. The subscription server 1002 may be aware of CBRS neutral host(s) 1006, which may operate CBRS small cells (network(s)) 1010 and may also provide an interface with Internet 1008. The provisioning of the information indicative of the geofencing area(s) representative of CBRS small cell coverage may be used by device 1020 to discover and connect with the CBRS small cells FIG. 13 shows a flow diagram illustrating an exemplary procedure for private LTE/NR network discovery, according to some embodiments. The device (e.g. device 1020) eSIM (e.g. eSIM 1012) may be provided the neutral host (e.g. neutral host 1006) address as well as the geofencing server (e.g. subscription provisioning server 1002) address (1102). The device may retrieve the location of the private CBRS network in addition to a list of frequencies from the geofencing server (1104). The device may periodically refresh the list of geofencing location(s), ("Yes" taken at 1106), by checking the private server for updated geolocations or new sites (1108). If the geofencing location list is not to be refreshed ("No" taken at 1106), the device may move and use its main SIM as the primary SIM to connect to a basic/major cellular network (1110). If the device's location is not within a provisioned geofencing area for CBRS ("No" taken at 1112), the device may continue to use its location engine in the background to monitor its location (1114). If the device's location is within a provisioned geofencing area for CBRS ("Yes" taken at 1112), and the device is in connected mode on its main SIM network ("Connected Mode" at 1116), the device may create gaps for CBRS measurements (1118). Creating gaps may include the creation of a small gap during which no transmission and reception takes place to allow the device to switch to a target cell from a current cell, perform signal quality measurements, then transition back to the current cell.

If the device is in idle mode on its SIM network ("Idle Mode" at 1116), it may begin performing inter-frequency measurements in the CBRS band after each paging (1120), finding a CBRS public land mobile network (PLMN) and connecting to the CBRS network in dual-SIM dual-standby (DSDS) mode. In some embodiments, when connecting to the CBRS network, the device may switch to the secondary SIM or eSIM as its primary SIM instead of the main SIM. For example, the device may use the credentials, context information and corresponding radio configuration associated with the secondary SIM as the primary (or default) information for wireless communications of the device. Subsequently, if the device is not within the geofencing area while the timer is still running ("No" taken at 1122), the device may deactivate the inter-frequency measurements in CBRS band after each paging (1124). If the device is within the geofencing area while the timer is still running ("Yes" taken at 1122), the device may remain connected to the CBRS network, and may also continue the inter-frequency measurements in the CBRS band after each paging.

Mobility Enhancements

In order to improve the mobility between CBRS LTE/NR networks and normal cellular coverage, the following enhancements may be implemented:

When entering a CBRS geofencing area and before beginning to scan for CBRS network(s), the device may save a list of all outdoor cellular coverage cells belonging to its home plan and their frequencies;

The device may use the scan history of the most recent previous non-private cell(s) for quick mobility;

When the cell level of CBRS cell falls below a certain specified (or predetermined) threshold, and the device is not in connected mode to connect to a CBRS wallet garden application, the device may create gaps and start scanning for the most recent previous cell in its main PLMN (note: wallet garden application is in reference to an application available only on the currently used CBRS cell); and The gaps may be created by requesting the network to create a gap using proprietary signaling or using autonomous gaps in connected mode.

Figure 14:
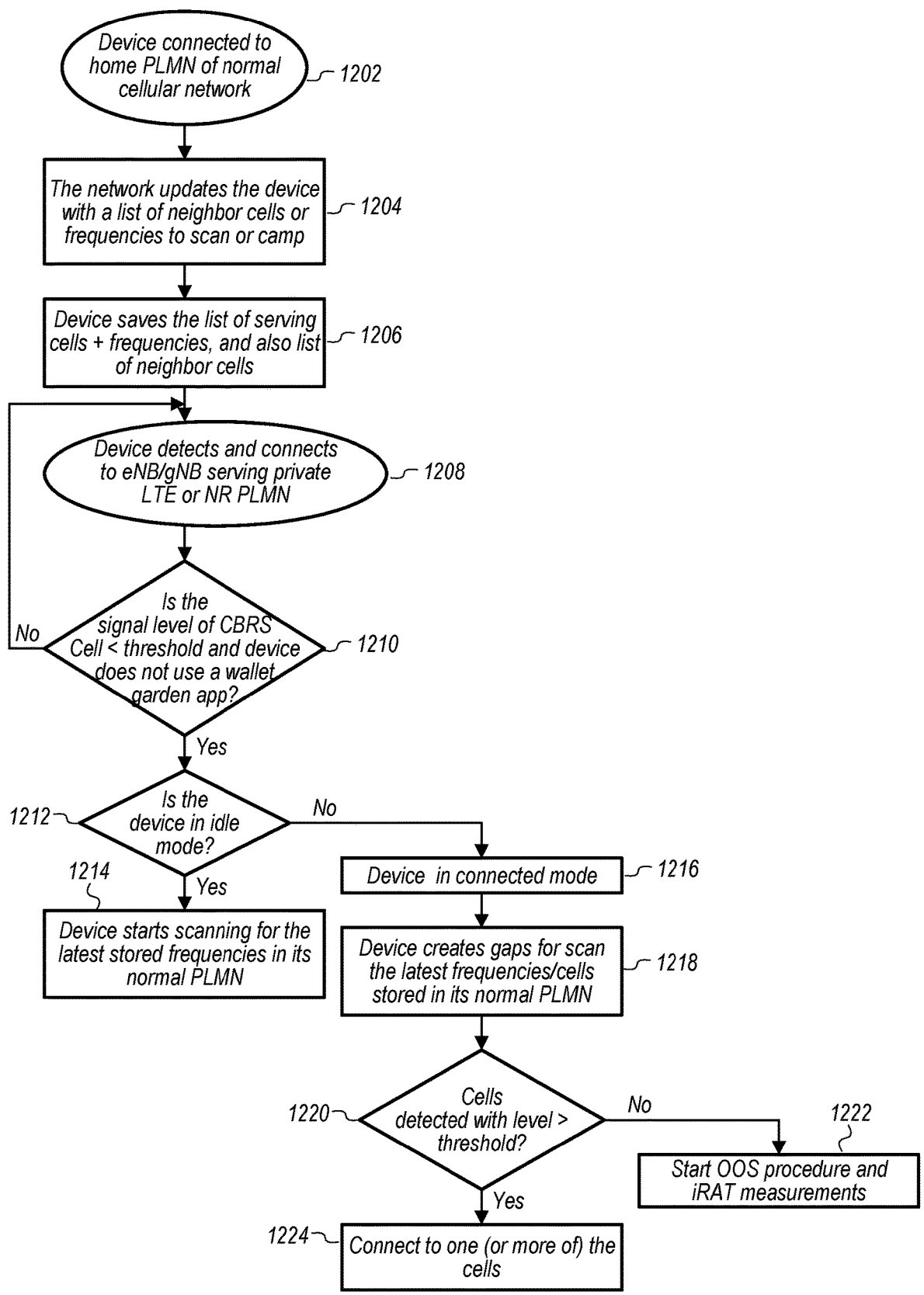
FIG. 14 shows a flow diagram of an exemplary method for mobility enhancements for mobile devices, according to some embodiments.

FIG. 14 shows a flow diagram of an exemplary method for mobility enhancements for mobile devices to transition between operating on major/subscriber cellular networks and private and/or CBRS networks, according to some embodiments. A device (such as UE 106 or 1020, for example) may be connected to a home PLMN of a standard cellular network, e.g. to the cellular network of a major service provider (1202). It should be noted that as referenced herein, standard cellular networks or major provider cellular networks are intended to denote cellular networks operated on the licensed spectrum allocated to cellular service providers and carriers, oftentimes using a SIM and/or USIM for operating on those networks, in contrast to, for example, cellular networks operated as CBRS networks (e.g. with neutral hosts). The network may update the device with a list of available neighbor cells and/or frequencies for which the device may scan and/or to which the device may attach (1204). The device may save the list of serving cells and/or serving frequencies, and may also save the list of neighbor cells (1206).

Using the saved information, the device may detect and connect to a base station (e.g. eNB/gNB) serving a private LTE or NR PLMN (1208). If the signal level of the CBRS cell to which the device is connected does not fall below a specified threshold value or the device is presently using a wallet garden app ("No" taken at 1210), the device may continue operating, e.g. communicating on the CBRS cell. However, if the signal level of the CBRS cell falls below a specified threshold value and the device is presently not using a wallet garden app ("Yes" taken at 1210), and the device is in idle mode ("Yes" taken at 1212), then the device may start scanning for the latest stored frequencies associated with its normal (standard cellular carrier) PLMN (1214). If the device is not in idle mode ("No" taken at 1212), the device is considered to be in connected mode (1216) and may create gaps for scanning for the latest frequencies/cells stored in its normal (standard cellular carrier) PLMN (1218). As previously mentioned, creating gaps may include the creation of a small gap during which no transmission and reception takes place to allow the device to switch to a target cell from a current cell, perform signal quality measurements, then transition back to the current cell. Subsequently, if the device detects cells having a signal level greater than a specified threshold value ("Yes" taken at 1220), the device may connect to one of those cells (1224). Otherwise, ("No" taken at 1220), the device may begin an out-of-sync (OOS) procedure and perform iRAT measurements (1222).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processor configured to cause a device to:
receive:
a first address identifying a provisioning server; and
a second address identifying a neutral host that operates one or more private cellular networks;
retrieve information associated with the one or more private cellular networks from the provisioning server identified by the first address, wherein the information indicates a geofencing area representative of private cellular network coverage for available private cellular networks of the one or more private cellular networks;
communicate according to a first wireless radio access technology (RAT) over a commercial cellular network; and
connect, via the neutral host identified by the second address, to a first private cellular network of the available private cellular networks and switch from communicating over the commercial cellular network to communicating over the first private cellular network, at least in response to determining based at least on the information that the device is located within the geofencing area.

2. The apparatus of claim 1, wherein the processor is configured to further cause the device to periodically obtain updated information associated with the one or more private cellular networks from the provisioning server, wherein the updated information indicates an updated geofencing area.

3. The apparatus of claim 1, wherein the processor is configured to further cause the device to continue to monitor its location at least in response to determining based at least on the information that the device is not located within the geofencing area.

4. The apparatus of claim 1, wherein the processor is configured to further cause the device to connect to the first private cellular network additionally in response to the device being in idle mode on the commercial cellular network.

5. The apparatus of claim 1, wherein the processor is configured to further cause the device to perform inter-frequency measurements in frequency bands associated with the available private cellular networks, prior to connecting to the first private cellular network, at least in response to: determining that the device is located within the geofencing area; and the device being in idle mode on the commercial cellular network.

6. The apparatus of claim 5, wherein the processor is configured to further cause the device to start the inter-frequency measurements after each paging.

7. The apparatus of claim 5, wherein the processor is configured to further cause the device to stop performing the inter-frequency measurements at least in response to an indication that device is no longer in the geofencing area.

8. The apparatus of claim 1, wherein the processor is configured to further cause the device to disconnect from the first private cellular network at least in response to a determination that a signal level of the first private cellular network is below a specified threshold value and the device is not using an application specific to the first private cellular network.

9. The apparatus of claim 1, wherein the processor is configured to further cause the device to communicate over the first private cellular network according to the first RAT.

10. A device comprising:
radio circuitry configured to facilitate wireless communications of the device according to a first radio access technology (RAT); and
a processor communicatively coupled to the radio circuitry and configured to cause the device to:
receive:
a first address identifying a provisioning server; and
a second address identifying a neutral host that operates one or more private cellular networks;
retrieve information associated with the one or more private cellular networks from the provisioning server identified by the first address, wherein the information indicates a geofencing area representative of private cellular network coverage for available private cellular networks of the one or more private cellular networks;
communicate according to a first wireless radio access technology (RAT) over a commercial cellular network; and
connect, via the neutral host identified by the second address, to a first private cellular network of the available private cellular networks and switch from communicating over the commercial cellular network to communicating over the first private cellular network, at least in response to determining based at least on the information that the device is located within the geofencing area.

11. The device of claim 10, wherein the processor is configured to further cause the device to periodically obtain updated information associated with the one or private cellular networks from the provisioning server, wherein the updated information indicates an updated geofencing area.

12. The device of claim 10, wherein the processor is configured to further cause the device to continue to monitor its location at least in response to determining based at least on the information that the device is not located within the geofencing area.

13. The device of claim 10, wherein the processor is configured to further cause the device to connect to the first private cellular network additionally in response to the device being in idle mode on the commercial cellular network.

14. The device of claim 13, wherein the processor is configured to further cause the device to perform inter-frequency measurements in frequency bands associated with the available private cellular networks, prior to connecting to the first private cellular network, at least in response to:
determining that the device is located within the coverage area; and
the device being in idle mode on the commercial cellular network.

15. The device of claim 14, wherein the processor is configured to further cause the device to start the inter-frequency measurements after each paging.

16. The device of claim 14, wherein the processor is configured to further cause the device to stop performing the inter-frequency measurements at least in response to an indication that device is no longer in the geofencing area.

17. The device of claim 10, wherein the processor is configured to further cause the device to disconnect from the first private cellular network at least in response to a determination that a signal level of the first private cellular network is below a specified threshold value and the device is not using an application specific to the first private cellular network.

18. The device of claim 10, wherein the processor is configured to further cause the device to communicate over the first private cellular network according to the first RAT.

19. A non-transitory memory element storing instructions executable by a processor to cause a device to:
receive:
a first address identifying a provisioning server; and
a second address identifying a neutral host that operates one or more private cellular networks;
retrieve information associated with the one or more private cellular networks from the provisioning server identified by the first address, wherein the information indicates a geofencing area representative of private cellular network coverage for available private cellular networks of the one or more private cellular networks;
communicate according to a first wireless radio access technology (RAT) over a commercial cellular network; and
connect, via the neutral host identified by the second address, to a first private cellular network of the private cellular networks and switch from communicating over the commercial cellular network to communicating over the first private cellular network, at least in response to determining based at least on the information that the device is located within the geofencing area.

20. The non-transitory memory element of claim 19, wherein the instructions are executable by the processor to further cause the device to periodically obtain updated information associated with the one or more private cellular networks from the provisioning server, wherein the updated information indicates an updated geofencing area.

* * * * *